United States Patent [19]
Cha

[11] Patent Number: 5,767,470
[45] Date of Patent: Jun. 16, 1998

[54] PROCESS AND DEVICE FOR REMOVAL OF COMBUSTION POLLUTANTS UNDER HIGH OXYGEN CONDITIONS

[76] Inventor: Chang Yul Cha, 3807 Reynolds St., Laramie, Wyo. 82070

[21] Appl. No.: 779,311

[22] Filed: Jan. 6, 1997

[51] Int. Cl.$^6$ .................... B01D 53/00; C01B 53/00; C01B 21/00; C01B 1/00
[52] U.S. Cl. ................ 204/157.3; 204/157.43; 204/157.46; 204/158.2
[58] Field of Search ............ 204/157.3, 157.43, 204/157.44, 157.46, 158.2

[56] References Cited

U.S. PATENT DOCUMENTS

| | | | |
|---|---|---|---|
| 4,545,879 | 10/1985 | Wan et al. | 204/158 R |
| 5,087,272 | 2/1992 | Nixdorf | 55/96 |
| 5,246,554 | 9/1993 | Cha | 204/157.43 |
| 5,256,265 | 10/1993 | Cha | 204/157.3 |
| 5,269,892 | 12/1993 | Cha | 204/157.3 |
| 5,277,770 | 1/1994 | Murphy | 204/157.43 |
| 5,330,732 | 7/1994 | Ishibashi et al. | 423/213.2 |
| 5,362,451 | 11/1994 | Cha | 422/186.3 |
| 5,423,180 | 6/1995 | Nobue et al. | 60/274 |
| 5,536,477 | 7/1996 | Cha et al. | 422/171 |

FOREIGN PATENT DOCUMENTS 454937  11/1991  European Pat. Off. .

OTHER PUBLICATIONS

Southworth, *Principles and Applications of Waveguide Transmission*, Nostrand, NY, 1950. No month available.
Kirk–Othmer, *Encyclopedia of Chemical Technology*, 3rd Edition, vol. 15, pp. 494–517, Microwave Technology; Supplementary Volume, pp. 599–608, Plasma Technology. No date avilable.
Perry, *Chemical Engineers' Handbook*, 6th Ed., pp. 9–10 to 9–13. No date available.

*Primary Examiner*—Kathryn L. Gorgos
*Assistant Examiner*—Edna Wong
*Attorney, Agent, or Firm*—John O. Mingle

[57] ABSTRACT

The subject invention is a process and device to effectively remove combustion pollutants under oxygen conditions greater than six volume percent. Microwave enhancement of oxidation/reduction catalysis is selectively employed in a multiple step process. However some of the steps do not utilize microwaves as they convert NO to $NO_2$ by employing a conventional oxidation catalyst, and which then in a subsequent step which does employ microwaves uses a reducing agent to undergo catalytic reduction to $N_2$.

9 Claims, 3 Drawing Sheets

PROCESS AND DEVICE FOR REMOVAL OF COMBUSTION POLLUTANTS UNDER HIGH OXYGEN CONDITIONS

BACKGROUND OF INVENTION

1. Field of Invention

The present invention relates to a process and a device for removing combustion pollutants, such as nitrogen oxides, carbon monoxide, particulate matter like soot, volatile organic compounds, and other hazardous air pollutants. In particular the present invention is designed to operate under high oxygen conditions that often occur in combustion gases.

2. Background

Combustion products often contain many substances that require removal before release to the environment. Among these pollutants are nitrogen oxides, carbon monoxide, particulate matter like soot, volatile organic compounds, and other hazardous air pollutants. In addition most combustion processes operate with considerable excess oxygen, usually from air, so that the combustion gases still contain much residual oxygen. A combustion gas containing more than six percent oxygen by volume is deemed to produce a high oxygen condition for removal of combustion products.

In particular it is economically desirable to remove all combustion pollutants with one pass through an appropriate device and not have to employ successive apparatuses to fully accomplish the needed pollutant removal. The subject invention accomplishes this with a two stage process employing the selective use of appropriate catalysts along with microwaves created as a radiofrequency energy field.

A particular difficult combustion pollutant is nitrogen oxides present in various forms and usually identified as $NO_x$ to incorporate $NO$, $NO_2$, etc. Microwave reduction of $NO_x$ proceeds well in the presence of pyrolytic carbon, such as char and soot, provided the oxygen content of the gas is small, less than 6 percent. As the oxygen content of the gas exceeds this 6 percent level, the removal of $NO_x$ becomes less and less efficient. Cha has shown this removal for the low oxygen situation in U.S. Pat. Nos. 5,246,554; 5,256,265; 5,269,892; and 5,362,451; and the specifications of these patents are hereby incorporated by reference. The subject invention covers the high oxygen case.

Quantum radiofrequency (RF) physics is based upon the phenomenon of resonant interaction with matter of electromagnetic radiation in the microwave and RF regions since every atom or molecule can absorb, and thus radiate, electromagnetic waves of various wavelengths. The rotational and vibrational frequencies of the electrons represent the most important frequency range. The electromagnetic frequency spectrum is conveniently divided into ultrasonic, microwave, and optical regions. The microwave region runs from 300 Mhz (megahertz) to 300 GHz (gigahertz) and encompasses frequencies used for much communication equipment. A treatise of such information is presented by Southworth, *Principles and Applications of Waveguide Transmission*, Nostrand, N.Y., 1950, which is herewith incorporated by reference.

Often the term microwaves or microwave energy is applied to a broad range of radiofrequency energies, such as 915 MHz to 5000 MHz, particularly with respect to the common frequencies, 915 MHz and 2450 MHz. The former is often employed in industrial heating applications while the latter is the frequency of the common household microwave oven and therefore represents a good frequency to excite water molecules.

The absorption of microwaves by the energy bands, particularly the vibrational energy levels, of the atoms or molecules results in the thermal activation of the nonplasma material and the excitation of valence electrons. The non-plasma nature of these interactions is important for a separate and distinct form of heating employs plasma formed by arc conditions at a high temperature, often more than 3000° F., and at much reduced pressures or vacuum conditions. For instance, refer to Kirk-Othmer, *Encyclopedia of Chemical Technology*, 3rd Edition, Supplementary Volume, pages 599–608, Plasma Technology. In microwave technology, as applied in the subject invention, neither condition is present and therefore no plasmas are formed.

Microwaves lower the effective activation energy required for desirable chemical reactions since they can act locally on a microscopic scale by exciting electrons of a group of specific atoms in contrast to normal global heating by raising the bulk temperature. Further this microscopic interaction is favored by polar molecules whose electrons become locally excited leading to high chemical activity; however, nonpolar molecules adjacent to such polar molecules are affected to a much lesser extent. An example is the heating of polar water molecules in a common household microwave oven where the container is of nonpolar material, that is, microwave-passing, and stays relatively cool.

As used above microwaves are often referred to as a form of catalysis when applied to chemical reaction rates. For instance, see Kirk-Othmer, *Encyclopedia of Chemical Technology*, 3rd Edition, Volume 15, pages 494–517, Microwave Technology.

Related United States patents using microwaves include:

| U.S. Pat. No. | Inventor | Year |
| --- | --- | --- |
| 4,545,879 | Wan et al. | 1985 |
| 5,087,272 | Nixdorf | 1992 |
| 5,246,554 | Cha | 1993 |
| 5,256,265 | Cha | 1993 |
| 5,269,892 | Cha | 1993 |
| 5,362,451 | Cha | 1994 |
| 5,277,770 | Murphy | 1994 |
| 5,423,180 | Nobue et al. | 1995 |
| 5,536,477 | Cha et al. | 1996 |

Referring to the above list, Nixdorf discloses using a filter containing silicon carbide whiskers to remove particulate matter from a gas stream and then clean said filter with microwave heating. The subject invention is not just a filter.

Cha ('554) discloses removing gas oxides by adsorption on a char bed and then reduction by microwaves as two distinct steps. The subject invention uses a related process for the removal of soot and some $NO_x$ in the presence of microwaves as one of several stages.

Cha ('265) discloses removing gas oxides in a homogeneous mixture with soot carried out in a waveguide reactor. In contrast the subject invention does not actively employ homogeneous reduction involving soot and has a non-microwave stage.

Cha ('892) discloses pyrolytic carbon bed for removal of gas oxides using microwave catalysis. The subject invention does not employ collecting a pyrolytic carbon bed since soot is burned as it is collected.

Cha ('451) discloses a waveguide reactor to efficiently perform radiofrequency catalysis. The subject invention does not employ a waveguide reactor.

Murphy discloses reactivating plasma initiators using microwaves in the presence of oxygen which is checked by a methane conversion reaction, where such plasma initiators are, or contain, metallic catalysts. The subject invention has no connection with the plasma regime of gases but does employ conventional metallic catalysts.

Nobue et al. disclose a filter regeneration system for an internal combustion engine using microwaves. The subject invention is not just a filter.

Cha et al. ('477) disclose a pollution arrestor using a soot filter followed by catalytic sections, using only reduction catalysts, to remove various gaseous pollutants with the total assembly within a microwave cavity. This pollution arrestor with only a reduction catalyst does not perform satisfactorily under high oxygen conditions. Conversely the subject invention performs well under high oxygen conditions.

SUMMARY OF INVENTION

The objectives of the present invention include overcoming the above-mentioned deficiencies in the prior art and performing effective removal of combustion pollutants with a single device under oxygen concentrations greater than six volume percent. The most difficult pollutant is NO and requires a special process step involving its conversion to $NO_2$ before final reduction to $N_2$.

DETAILED DESCRIPTION OF INVENTION

Figure 1:
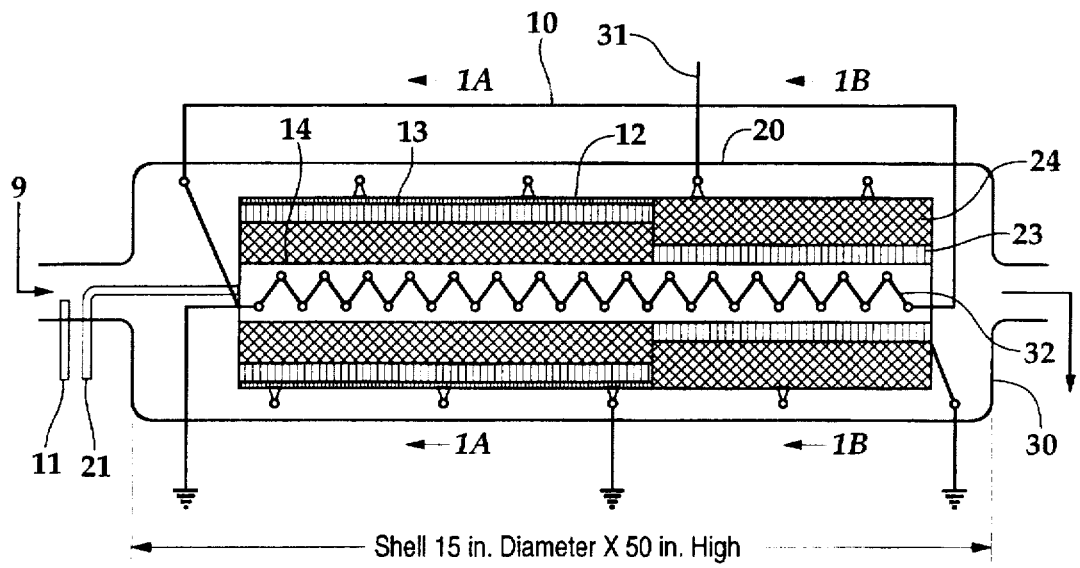
FIG. 1 shows the device for pollution removal along with sectionals, FIGS. 1A and 1B.

The pollutants associate with combustion products represent nitrogen oxides, $NO_x$, carbon monoxide, CO, particulate matter less than 10 microns, PM10, unburned products of combustion, volatile organic compounds, VOC, and other hazardous air pollutants, HAP. Most of the soot is likely present in PM10 material. In addition in the subject case the concentration of the combustion gases contains oxygen in excess of six volume percent which is common in combustion processes where excess air is employed.

Traditionally the method to remove the full range of combustion pollutants involves several distinct steps. First the particulate matter is filtered out which requires replacing filters and regenerating the subsequent clogged filters. For removal of $NO_x$ selective noncatalytic reduction can be employed by using a reducing agent such as anhydrous ammonia or urea injected immediately after combustion and is often employed in large coal-fired power plants, but the efficiency is low. Alternatively a selective catalytic reduction is employed where the gases after addition of a reducing agent are past through a reduction catalyst that produces nitrogen gas and water, but good efficiency requires high temperatures greater than 750° F. Unutilized ammonia is often an additional problem is this conventional removal process for $NO_x$.

Once particulate matter and $NO_x$ are treated, then any other combustion pollutants are oxidized in a conventional manner often by a type of industrial catalytic converter.

Because of various process conditions the conventional treatment of combustion gases for pollutant removal requires three operating levels and separate equipment. The subject invention overcomes this restriction by using a single device.

The subject invention employs microwaves which are a versatile form of energy that is applicable to enhance chemical reactions, since the energy is locally applied by its vibrational absorption by polar molecules and does not produce plasma conditions. A class of enhanced reactions are those whose reaction kinetics appear unfavorable at desirable bulk temperature conditions, such as below about 300° F.

A unique form of microwave chemistry is microwave or radiofrequency catalysis which is performed with char where it is formed into large bed particles and exposed to various gases. Char is a form of pyrolytic carbon, but is not commonly identified as soot, and is formed by driving gases from coal in a non-oxidizing atmosphere. Common soot is often formed in an oxidizing gas due to incomplete combustion, but also appears as the degradation of hydrocarbons. Since char and soot are both pyrolytic carbon with polar constituents, their equivalency for microwave catalysis has been shown by Cha ('477) and such specification is hereby incorporated by reference.

Cha ('477) performs a laboratory setup to determine the effect of microwave catalysis at high wattage upon the reduction of NO to $N_2$ in the presence of soot. With 1000 ppm NO in 75% $N_2$ and 25% air at 500 watts, the 5.25% $O_2$ test showed good reduction of NO reaching only 16 ppm after 10 minutes. Conversely with 1000 ppm NO in 50% $N_2$ and 50% air at 500 watts, the 10.5% $O_2$ test showed considerably poorer reduction of NO reaching only 60 ppm in 10 minutes. Cha ('477) gives data for several other test runs. Currently it has been determined that the appropriate breakpoint is about 6% oxygen; thus, more than 6% volume percent oxygen is designated as high oxygen conditions and is the subject of the subject invention.

Figure 2:
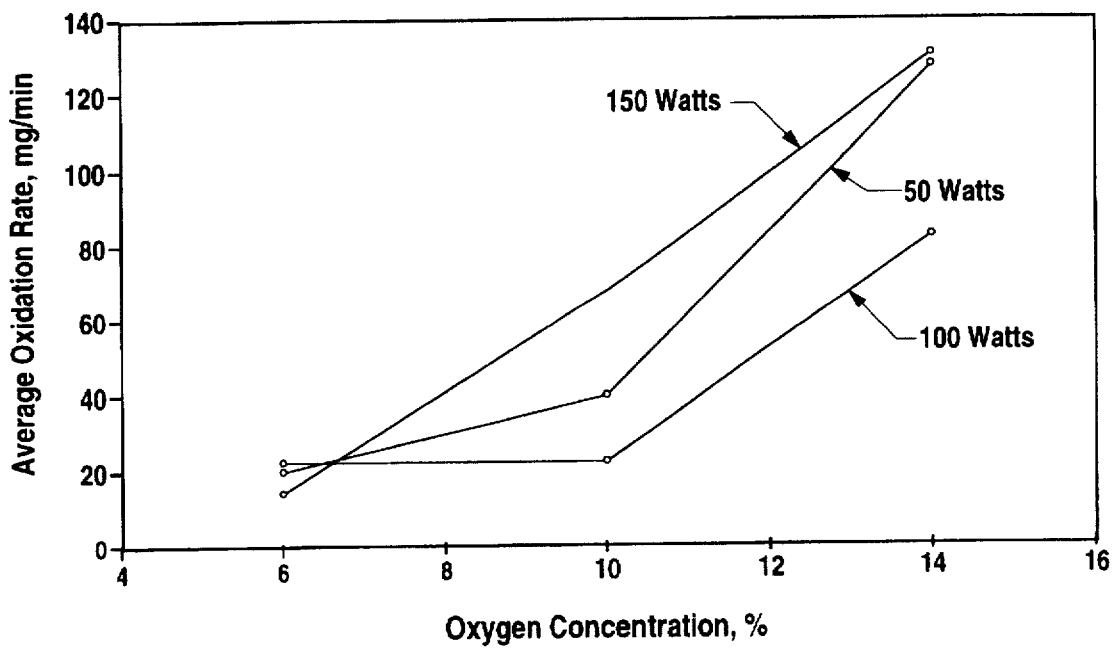
FIG. 2 shows microwave soot oxidation rates in the presence of NO.
Figure 3:
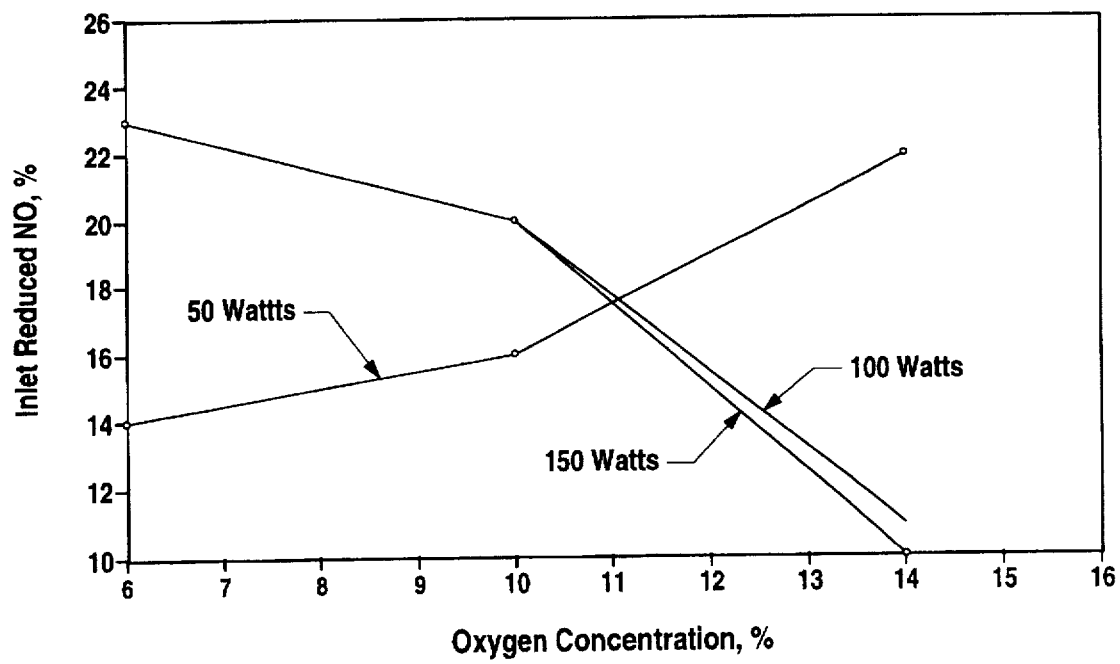
FIG. 3 shows microwave NO reduction by soot.

FIG. 2 is a plot of microwave soot oxidation rates in the presence of 1000 ppm NO and oxygen concentrations above 6 percent at wattage values below 150 watts using the laboratory setup of Cha ('477). The 14% $O_2$ data well indicate good oxidation rates. FIG. 3 gives the result from this same set of tests of the poor NO reduction by microwave catalysis and soot under these high oxygen conditions. Only the 50 watt test data show even reasonable results. For both FIG. 2 and FIG. 3 the test conditions were 1000 ppm NO in inlet gas with a total gas flow rate of 5 SCFH, and initial soot of 500 mg in an 0.5" ID quartz tube using a waveguide reactor.

The conclusion is that microwave reduction of NO by soot under high oxygen conditions is poor. Thus additional catalytic processes are required to reduce NO concentrations to acceptable levels in combustion gases under these high oxygen conditions.

Figure 4:
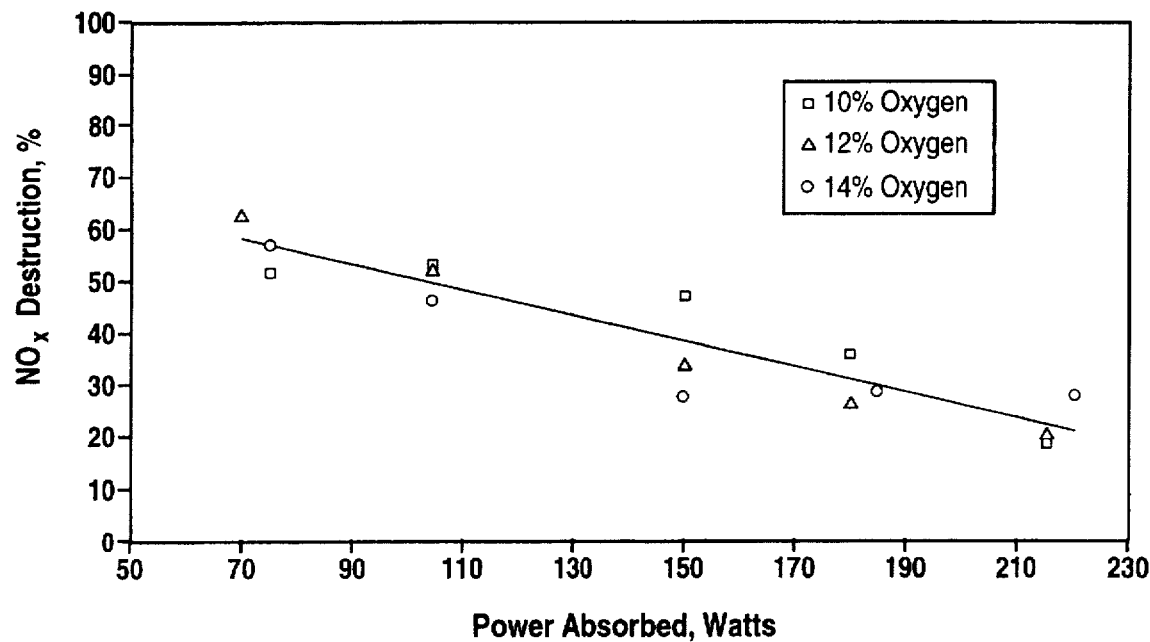
FIG. 4 shows microwave $NO_x$ reduction under high oxygen concentrations.

FIG. 4 shows the test results of microwave destruction percentages using platinum/rhodium (Pt/Rh) catalyst. Little dependence was found over the 10, 12 and 14 percent oxygen concentrations in the inlet gas. The test conditions were an inlet gas containing 1000 ppm of $NO_x$, which was about 90 ppm NO and 10 ppm $NO_2$, and 1000 ppm JP-8 was passed through a 5.5-inch long 1-inch diameter of Pt/Rh zeolite to oxidize approximately one-half of the NO to $NO_2$, and then a second 1-inch tube containing a bed of Pt/Rh zeolite mixed with SiC was employed to reduce the $NO_2$ to $N_2$ using a waveguide reactor. The Pt/Rh catalyst was an oxidation/reduction type made by United Catalyst and designated PRO-VOC 7 Zeolite catalyst or its equivalent;

further, it is best to employ a zeolite substrate for such catalyst, as the commonly used alumina or clay substrate is less effective in similar tests. The zeolite, silicon carbide mixture is required in order to absorb microwaves since zeolite itself is non-microwave absorbing. The JP-8 is a reducing agent. The results indicate that reasonable $NO_2$ destruction occurs, about 50 percent at low microwave power with decreasing amounts at higher powers. This suggests that at least two such stages, and likely more, are required to approach a 90 percent reduction of NO which is the ideal target requirements.

Figure 5:
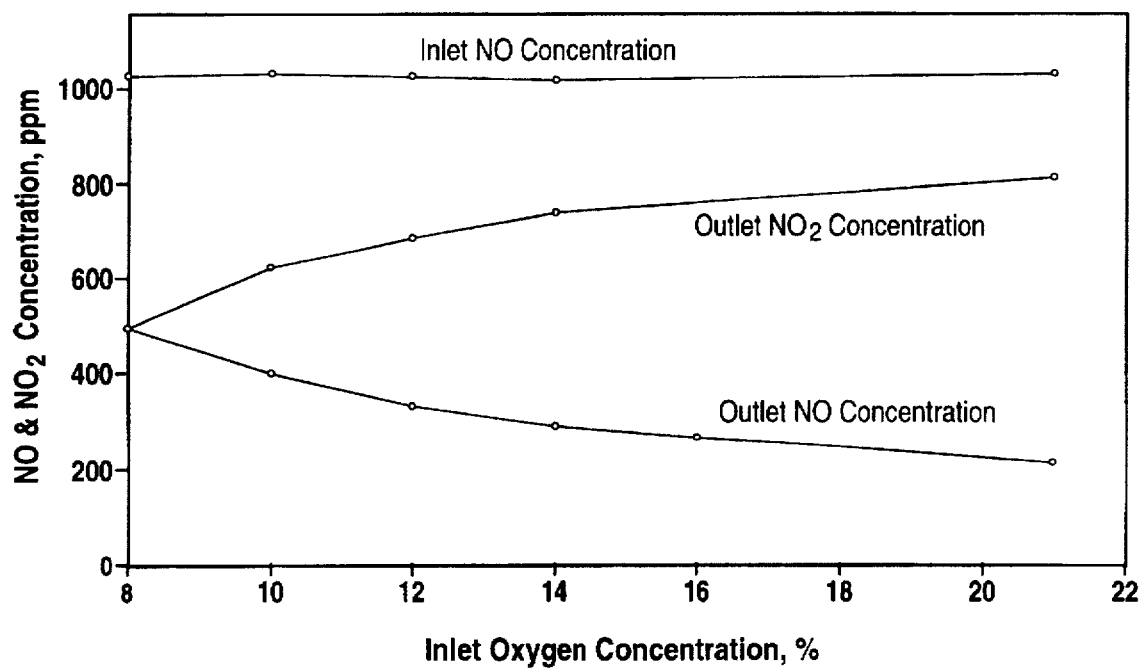
FIG. 5 shows NO oxidation with Pt/Rh zeolite catalyst.

FIG. 5 shows the oxidation of NO to $NO_2$ using Pt/Rh zeolite catalyst under various high oxygen concentrations or conditions without using microwaves; thus, room temperature was present. The test conditions were 51.00 grams of Pt/Rh zeolite catalyst presaturated with NO and $NO_2$ in a one inch quartz tube with 1000 ppm NO in 10 SCFH purge gas. Adequate conversion of NO to $NO_2$ resulted but it was evident that in many situations more than one stage would be required.

The subject invention thus requires both microwave and non-microwave processes. For a microwave absorbing region the catalyst formed on a zeolite substrate is mixed with SiC; for a non-microwave absorbing region, no SiC is employed.

The subject invention as a single device must remove soot as a first step before it starts additional removal of other combustion pollutants since soot can foul any catalysts employed if microwave energy is not present. The PM10, which is largely soot, is removed with a ceramic filter to stand high temperature conditions and is burned with microwaves in place on said filter since high oxygen conditions are present. The reaction is:

$$C + O_2 ---(RF)---> CO_2 \qquad (1)$$

where ---(RF)---> implies that RF microwave energy catalyzes the reaction to proceed in the direction indicated at a lower bulk temperature than normal burning would transpire. A convenient bulk temperature is about 300° F., but temperatures up to about 500° F. are often utilized. Periodic microwave energy is sometimes utilized under high soot conditions since this reaction is highly exothermic so time for cooling is needed. A small amount of microwave catalytic reduction of $NO_x$ to $N_2$ does occur under these high oxygen conditions in contrast to the low oxygen condition, under six volume percent, where such microwave catalysis readily occurs.

The second section of the first stage of the process reacts NO to the $NO_2$ chemical form which is required in the subsequent section in order to be reduced by a conventional oxidation/reduction catalyst under these high oxygen conditions. This section employs a conventional oxidation zeolite catalyst to insure substantial NO is converted to $NO_2$ and this step is performed with minimal microwave interaction since the catalyst substrate employed is non-microwave absorbing.

The third section of the first stage is a microwave enhanced reaction using a conventional oxidation/reduction catalyst, such as Pt/Rh, with a reducing agent. This reducing agent is a thermally stable hydrogen containing material, such as No. 2 distillate fuel oil or its common equivalent, JP-8. A significant amount of the $NO_2$ formed in the previous step is reduced to $N_2$. Other oxidizable pollutants are partially oxidized in this high oxygen atmosphere.

In order to reduce the $NO_x$ concentration to low enough levels to be released to the atmosphere which generally requires a 90 percent reduction, a second stage is added to the subject device. This stage two is an additional two step catalysis performed under these high oxygen conditions repeating the second and third steps of stage one, and uses a conventional catalyst of the oxidation/reduction type, such as Pt/Rh. The first section of stage two oxidizes a significant amount of the remaining NO to $NO_2$ under non-microwave conditions which is then reduced to $N_2$ in the next section as further oxidation occurs of the remaining pollutants. Any excess JP-8 is treated as another pollutant to be further oxidized. In order for the Pt/Rh catalyst to perform the needed oxidation/reduction, it requires energy from microwaves, so the catalyst particles are immersed within a bed of silicon carbide that is a good microwave absorber. Again the Pt/Rh catalyst is made with a zeolite substrate. For the non-microwave conditions no SiC is employed.

The properties of No. 2 distillate fuel oil are reported in Perry, *Chemical Engineers' Handbook*, 6th Ed., pages 9–10 to 9–13, and this information is hereby incorporated by reference. An important property of JP-8 or any reducing agent is that it be thermally stable at the about 500° F. temperatures involved. Further its volatility is such so that it can be injected as a liquid but quickly evaporate into a vapor as it mixes with the gases. The important properties of JP-8, a designation established by the United States Air Force, include a specific gravity, 60/60° F., in the range of 0.788 to 0.845; a hydrogen content of a minimum of 13.5 weight percent; a boiling range of 300° to 626° F.; a freezing point of a maximum of −58° F.; and an aromatic content of a maximum of 25 volume percent. In general a reducing agent is employed selected from the group consisting of normal-hexane, iso-hexane, JP-8, number two grade of fuel oil, and combinations thereof.

After leaving the second stage the exit gas has a substantial portion of nitrogen in the $N_2$ state and all combustible gases are substantially burned, so that the exit gas is substantially free of pollutant CO and contains ideally no more than ten percent of the original $NO_x$.

Figure 1A:
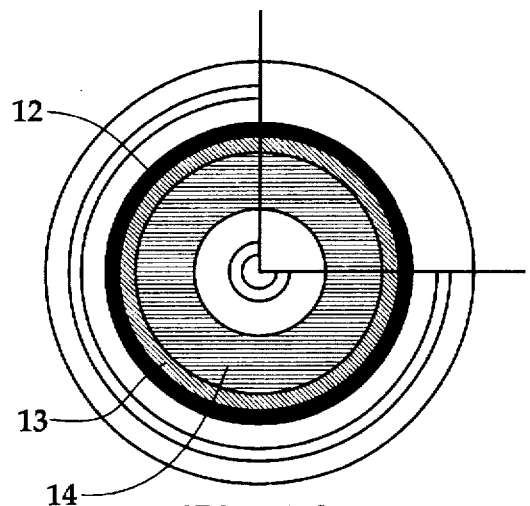
Figure 1B:
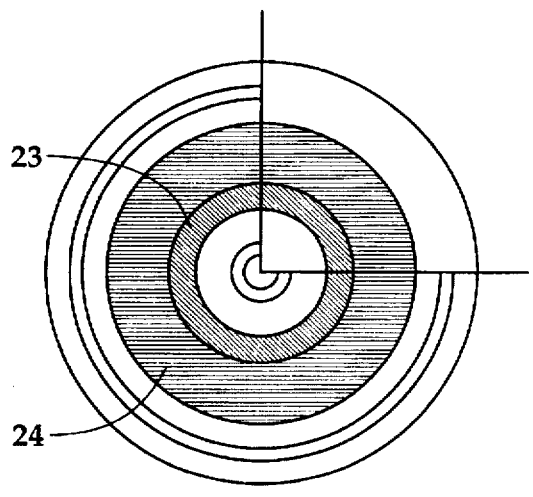

FIGS. 1, 1A, and 1B show the subject invention as a single device which treats polluted combustion gases. FIG. 1 shows the complete device with its two stages. FIG. 1A is a cross section at A—A, while FIG. 1B is a cross section at B—B. The device consists of stage one 10 and stage two 20. The polluted combustion gases 9 enter and are injected 11 with a small amount of reducing agent JP-8 to mix well with the gases. The gases then enter a ceramic filter 12, such as Nextel type made by 3M Company or equivalent, which removes PM10 which contains much soot that easily absorbs microwaves. After soot removal by filtering and burning the gases pass through a Pt/Rh catalyst bed 13 which has a non-microwave absorbing substrate containing no SiC and this bed oxidizes NO to $NO_2$. The JP-8 reducing agent passes through unreacted since this bed does not absorb microwaves. This is followed by another bed of Pt/Rh catalyst 14 on a microwave absorbing zeolite substrate containing SiC, and this selectively oxidizes and reduces $NO_x$, CO, VOC, and HAP since much oxygen is present.

Stage two 20 has additional JP-8 injection 21 as the gases enter a Pt/Rh catalyst bed 23 again with a non-microwave absorbing substrate where much of the remaining NO is oxidized to $NO_2$. Because microwaves are not absorbed in this section, the reducing agent JP-8 passes through unreacted. The last section is again a Pt/Rh catalyst bed 24 on a microwave absorbing zeolite substrate where final reduction of $NO_2$ occurs as well as oxidation of any remaining JP-8.

Surrounding the total device within the structurally supporting shell 30 is a general microwave input point 31 that effectively distributes the microwaves throughout the device using an antenna or helix waveguide 32.

FIG. 1 shows a 24 inch height to stage one and a 16 inch height to stage two; however, these were just convenient measurements during the building of the initial prototype. An actual production model would be sized in accordance with variables of the combustion gases stream, such as the flow rate and concentration of pollutants of said gases, in order to obtain a reasonable pressure drop and to reduce the level of pollutants to an acceptable value. Further the geometric shape of the device is not critical as the important aspect is that the various sections as well as the stages be positioned in a serial arrangement. Thus one large cylindrically concentric system is employable but other equivalent arrangements are also useable.

As a general description the device for removal of pollutants from a combustion stream comprises an encompassing structural shell containing a microwave energy field thus forming a microwave cavity. Within said shell is positioned several serial stages the first of which collects and burns soot on a ceramic filter. This filter may contain silicon carbide to enhance the soot burning. Following said filter is a plurality of additional stages each consisting of an oxidation/ reduction catalyst, such as Pt/Rh or equivalent, on two distinct substrates positioned serially: (a) a microwave-passing substrate, and (b) a microwave-absorbing substrate. The microwave-passing substrate contains no carbon and is zeolite based or equivalent. Zeolite is a class of minerals that are hydrated aluminosillicates. The microwave-absorbing substrate contains carbon, preferably carbon containing polar molecules, and is silicon carbide or equivalent, but also may contain zeolite. The microwave-absorbing substrate has the additional provision of allowing, but not requiring, reducing agent injection. An equivalent bed can be made using SiC foam with fine catalyst material interspersed within it supported on an alumina or zeolite substrate.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

I claim:

1. A process for removal of pollutants from a combustion stream containing more than six percent oxygen by volume comprising:
    passing said stream through a filter in contact with microwaves to collect and burn soot;
    oxidizing without microwave enhancement nitric oxide to nitrogen dioxide by employing a first oxidation/ reduction catalyst;
    removing said nitrogen dioxide by using microwave enhanced reduction with a second oxidation/reduction catalyst in contact with a reducing agent; and
    removing combustible pollutants by using microwave enhanced oxidation with a third oxidation/reduction catalyst.

2. The process according to claim 1 wherein said filter further comprises silicon carbide.

3. The process according to claim 1 wherein said first oxidation/reduction catalyst comprises platinum/rhodium catalyst on a zeolite substrate.

4. The process according to claim 1 wherein said third oxidation/reduction catalyst comprises platinum/rhodium catalyst on a substrate selected from the group consisting of alumina, zeolite, and clay.

5. The process according to claim 1 wherein all of said oxidation/reduction catalysts comprise platinum/rhodium catalyst on a zeolite substrate.

6. The process according to claim 1 wherein said combustible pollutants are selected from the group consisting of carbon monoxide, volatile organic compounds, unburned combustion products, and combinations thereof.

7. The process according to claim 1 wherein said reducing agent is selected from the group comprising normal-hexane, iso-hexane, No. 2 distillate fuel oil, number two grade of fuel oil, and combinations thereof.

8. The process according to claim 1 wherein said microwaves comprise radiofrequency energy selected from the range consisting of 915 to 5000 Mhz.

9. The process according to claim 1 wherein said microwave enhanced oxidations and reductions comprise using a substrate containing silicon carbide.

\* \* \* \* \*